United States Patent
Fukami et al.

(10) Patent No.: US 8,711,293 B2
(45) Date of Patent: Apr. 29, 2014

(54) LIQUID CRYSTAL SHUTTER GLASSES

(75) Inventors: Tetsuo Fukami, Ishikawa-ken (JP);
Shigesumi Araki, Ishikawa-ken (JP);
Tetsuya Kojima, Ishikawa-ken (JP);
Toshiyuki Higano, Ishikawa-ken (JP);
Kenji Nakao, Ishikawa-ken (JP)

(73) Assignee: Japan Display Inc., Tokyo (JP)

( * ) Notice: Subject to any disclaimer, the term of this patent is extended or adjusted under 35 U.S.C. 154(b) by 422 days.

(21) Appl. No.: 12/974,749

(22) Filed: Dec. 21, 2010

(65) Prior Publication Data
US 2011/0149182 A1 Jun. 23, 2011

(30) Foreign Application Priority Data
Dec. 21, 2009 (JP) ................................ 2009-289587

(51) Int. Cl.
*G02F 1/1335* (2006.01)
*G02F 1/1343* (2006.01)

(52) U.S. Cl.
USPC ............. 349/13; 349/141; 349/142; 349/143; 349/146

(58) Field of Classification Search
USPC .................................... 349/13, 146, 141–143
See application file for complete search history.

(56) References Cited

U.S. PATENT DOCUMENTS

| 4,617,563 | A * | 10/1986 | Fujiwara et al. | 345/87 |
| 6,266,106 | B1 * | 7/2001 | Murata et al. | 349/15 |
| 6,927,825 | B1 * | 8/2005 | Koma et al. | 349/133 |
| 2007/0076144 | A1 * | 4/2007 | Okita et al. | 349/107 |

OTHER PUBLICATIONS

U.S. Appl. No. 13/724,425, filed Dec. 21, 2012, Kojima, et al.

* cited by examiner

*Primary Examiner* — Jessica M Merlin
(74) *Attorney, Agent, or Firm* — Oblon, Spivak, McClelland, Maier & Neustadt, L.L.P.

(57) ABSTRACT

In one embodiment, a pair of liquid crystal shutter glasses include a first liquid crystal shutter and a second liquid crystal shutter. The first and second liquid crystal shutters are switched to a transmissive state by turns. The respective first and second liquid crystal shutters include a first electrode substrate and a second electrode substrate opposing the first electrode substrate. An OCB (Optically Compensated Bend) mode liquid crystal layer is held between the first and second electrode substrates. The first electrode substrate includes a first electrode and a second electrode arranged adjacent to the first electrode. The first and second electrodes respectively include a side opposing each other and a plurality of projecting portions provided to the respective opposing sides of the first and second electrodes alternately.

7 Claims, 12 Drawing Sheets

LIQUID CRYSTAL SHUTTER GLASSES

CROSS-REFERENCE TO RELATED APPLICATION

This application is based upon and claims the benefit of priority from prior Japanese Patent Application No. 2009-289587, filed Dec. 21, 2009, the entire contents of which are incorporated herein by reference.

FIELD

The present invention relates to a pair of liquid crystal shutter glasses used for observing three-dimensional image, etc.

BACKGROUND

In recent years, various systems for observing three-dimensional image are proposed. As the system for observing three-dimensional image, there are two types in which the glasses for exclusive use are required or not. The system using glasses for exclusive use is disclosed, for example, in Japanese Laid open Patent Application No. 2001-154640. In the technology disclosed in the patent application, a liquid crystal display device displays a right eye image and a left eye image by alternately switching for every frame period. On the other hand, a pair of polarized glasses with a liquid crystal shutter consists of a liquid crystal optical means and polarizing plates for switching an alignment state of the liquid crystal in synchronization with the switching of the right eye image and the left eye image.

The liquid crystal shutter glasses are configured by holding a liquid crystal layer between a first electrode substrate and a second electrode substrate like a usual liquid crystal display panel. In order to raise a time aperture ratio of the liquid crystal shutter glasses, high response speed is required to the liquid crystal shutter glasses. Accordingly, the liquid crystal in the OCB (optically compensated bend) mode receives attention as the liquid crystal responding to such requirement.

However, the shutter glasses using the liquid crystal in such OCB mode, it is necessary to make the phase transition from a splay alignment state to a bend alignment state in early stage of the operation. If the initial phase transition takes a long time, the user's discomfort feeling may be caused.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
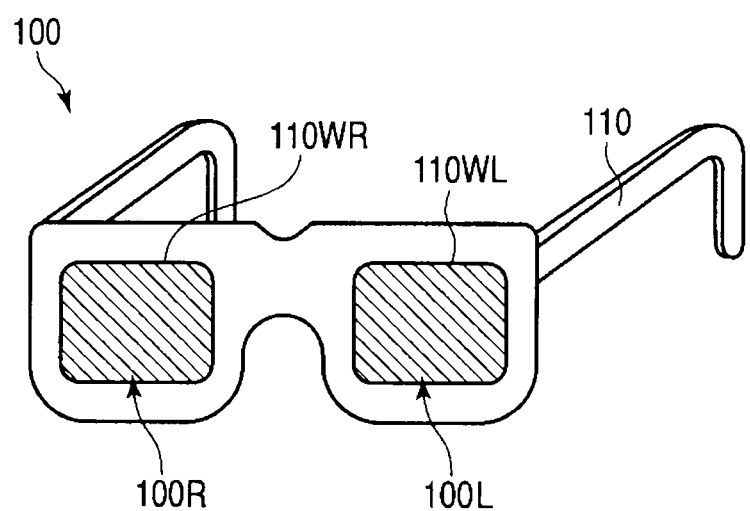
FIG. 1 is a perspective diagram schematically showing a structure of a pair of shutter glasses according to one embodiment of the present invention.

A pair of liquid display shutter glasses according to an exemplary embodiment of the present invention will now be described with reference to the accompanying drawings wherein the same or like reference numerals designate the same or corresponding portions throughout the several views.

In one embodiment, a pair of liquid crystal shutter glasses includes: a first liquid crystal shutter for right eye; and a second liquid crystal shutter for left eye, the first and second liquid crystal shutters being switched to a transmissive state by turns; the respective first and second liquid crystal shutters including; a first electrode substrate and a second electrode substrate opposing the first electrode substrate, and an OCB (Optically Compensated Bend) mode liquid crystal layer held between the first and second electrode substrates, wherein the first electrode substrate includes a first electrode and a second electrode adjacent to the first electrode, and the first and second electrodes respectively include a side opposing each other and a plurality of projecting portions provided to the respective opposing sides of the first and second electrodes alternately.

FIG. 1 is a perspective diagram schematically showing the structure of the shutter glasses 100. As shown in FIG. 1, the shutter glasses 100 are equipped with a frame portion 110, a shutter 100R for right eye, and a shutter 100L for left eye. The frame portion 110 has a window portion 110WR for right eye, and a window portion 110WL for left eye. The shutter 100R for right eye is fixed to the frame portion 110 so that the shutter 100R may be exposed from the window portion 110WR for right eye. Similarly, the shutter 100L for left eye is fixed to the frame portion 110 so that the shutter 100L may be exposed from the window portion 110WL for left eye.

Figure 2:
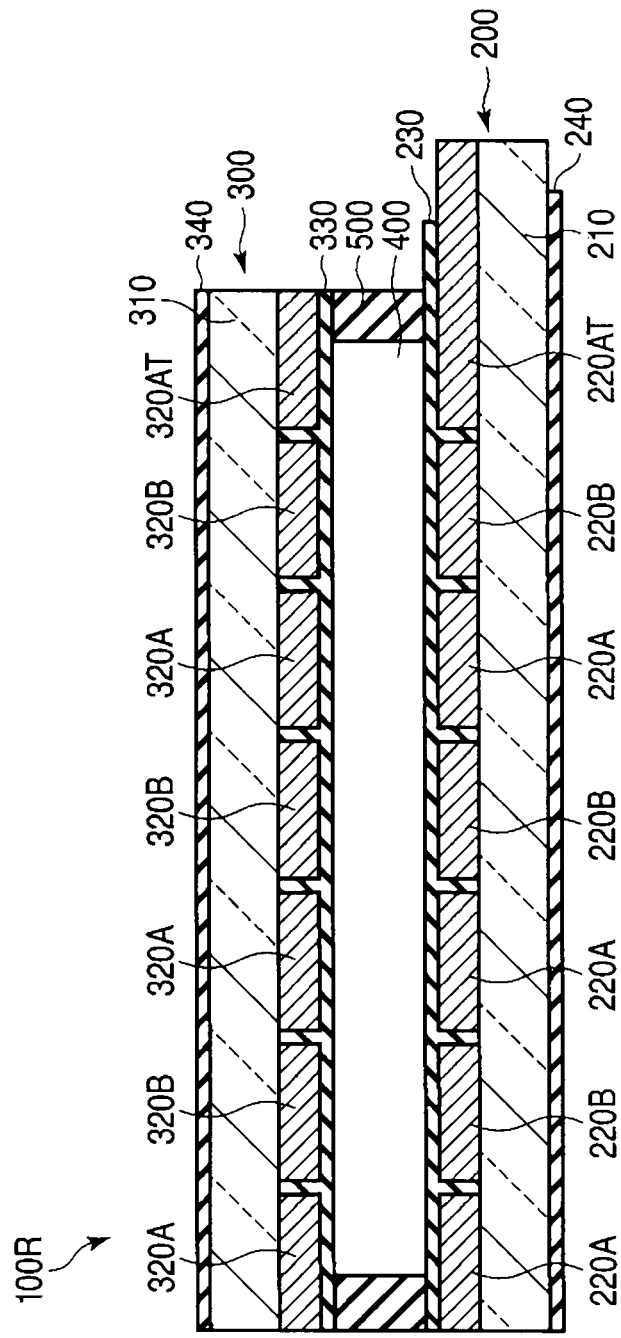
FIG. 2 is a cross-sectional view schematically showing a structure of a first electrode substrate and a second electrode substrate of the shutters for right eye and second eye shown in FIG. 1.

FIG. 2 is a cross-sectional view of the shutter 100R for right eye shown in FIG. 1. In addition, since the structure of the shutter 100L for left eye is the same as the structure of the shutter 100R for right eye, the explanation is omitted.

The shutter 100R for right eye is constituted by a first electrode substrate 200, a second electrode substrate 300, and a liquid crystal layer 400 held between the first and second electrode substrates 200 and 300. The first and second electrode substrates 200 and 300 are sealed with a seal component 500 arranged around the substrates together.

The first electrode substrate 200 is formed of a first insulating substrate 210, such as a glass substrate with light transmissive characteristics. On the first insulating substrate 210, a first electrode 220A and a second electrode 220B are arranged. The first electrode 220A and the second electrode 220B are arranged alternately on the same plane in this embodiment. The first electrode 220A is arranged so that a gap is formed between the first electrode 220A and the second electrode 220B apart from the second electrode 220B. The first electrode 220A and the second electrode 220B are formed of electric conductive materials with light transmissive characteristics, such as Indium Tin Oxide (ITO) and Indium Zinc Oxide (IZO). A first transfer (not illustrated) is arranged on a connection end 220AT of the first electrode 220A, and a second transfer (not illustrated) is similarly arranged on a connection end 220BT of the second electrode 220B. Moreover, a surface of the first electrode substrate 200 which contacts with the liquid crystal layer 400 is covered with a first alignment film 230.

The second electrode substrate 300 is formed of a second insulating substrate 310, such as a glass substrate with light transmissive characteristics. On the second insulating substrate 310, a third electrode 320A and a fourth electrode 320B are arranged. The third electrode 320A and the fourth electrode 320B are arranged alternately. The third electrode 320A is arranged so that a gap is formed between the third electrode 320A and the fourth electrode 320B apart from the fourth electrode 320B. The third electrode 320A is arranged so as to oppose to the first electrode 220A. Similarly, the fourth electrode 320B is arranged so as to oppose to the second electrode 220B. The third electrode 320A and the fourth electrode 320B are formed of electric conductive materials with light transmissive characteristics, such as Indium Tin Oxide (ITO) and Indium Zinc oxide (IZO). A connection end 320AT of the third electrode 320A is connected with the connection end 220BT of the second electrode 220B through a first transfer. A connection end 320BT of the fourth electrode 320B is connected with the connection end 220AT of the first electrode 220A through a second transfer. Moreover, a surface which contacts with the liquid crystal layer 400 of the second electrode substrate 300 is covered with a second alignment film 330.

When the first electrode substrate 200 and the second electrode substrate 300 are arranged so that the first alignment film 230 and the second alignment film 330 oppose each other, a predetermined gap, for example, a gap of 5 μm, is formed of spacers (not shown) arranged between the first and second alignment films 230 and 330.

The liquid crystal layer 400 is injected in the gap formed between the first electrode substrate 200 and the second electrode substrate 300. The liquid crystal layer 400 is formed of the liquid crystal composite containing liquid crystal molecules, for example, nematic liquid crystal material.

Rubbing processing of the first alignment film 230 and the second alignment film 330 is carried out in parallel each other in a slant direction by 45° in FIG. 2. The liquid crystal molecules contained in the liquid crystal layer 400 are aligned by regulation strength by the first alignment film 230 and the second alignment film 330.

Moreover, a first optical element 240 and a second optical element 340 are formed in an external surface (namely, opposite surface to that which contacts with the liquid crystal layer 400) of the first electrode substrate 200 and the second electrode substrate 300, respectively. The first optical element 240 and the second optical element 340 include a polarizing plate to define polarization direction according to the characteristic of the liquid crystal layer 400, or a retardation film.

In a non-operating state of the shutter glasses 100 with the shutter 100R for right eye and a shutter 100L for left eye, namely, when a voltage difference is not formed between the first electrode 220A and the second electrode 220B, the first electrode 220A and the third electrode 320A, the second electrode 220B and the fourth electrode 320B, and the third electrode 320A and the fourth electrode 320B, the alignment of the liquid crystal molecules is a splay alignment state. In contrast, in an operating state of the shutter glasses 100, namely, when a voltage difference is formed between the first electrode 220A and the second electrode 220B, the first electrode 220A and the third electrode 320A, the second electrode 220B and the fourth electrode 320B, and the third electrode 320A and the fourth electrode 320B, the alignment of the liquid crystal molecules is a bend alignment state in which the alignment direction of the liquid crystal molecules curves like a bow. Therefore, in the operating state of the shutter glasses 100, the transmissivity is modulated by controlling the inclination of the liquid crystal molecule. According to the modulation, the shutter 100R for right eye and the shutter 100L for left eye are switched between the transmissive state and the non-transmissive state.

Figure 3:
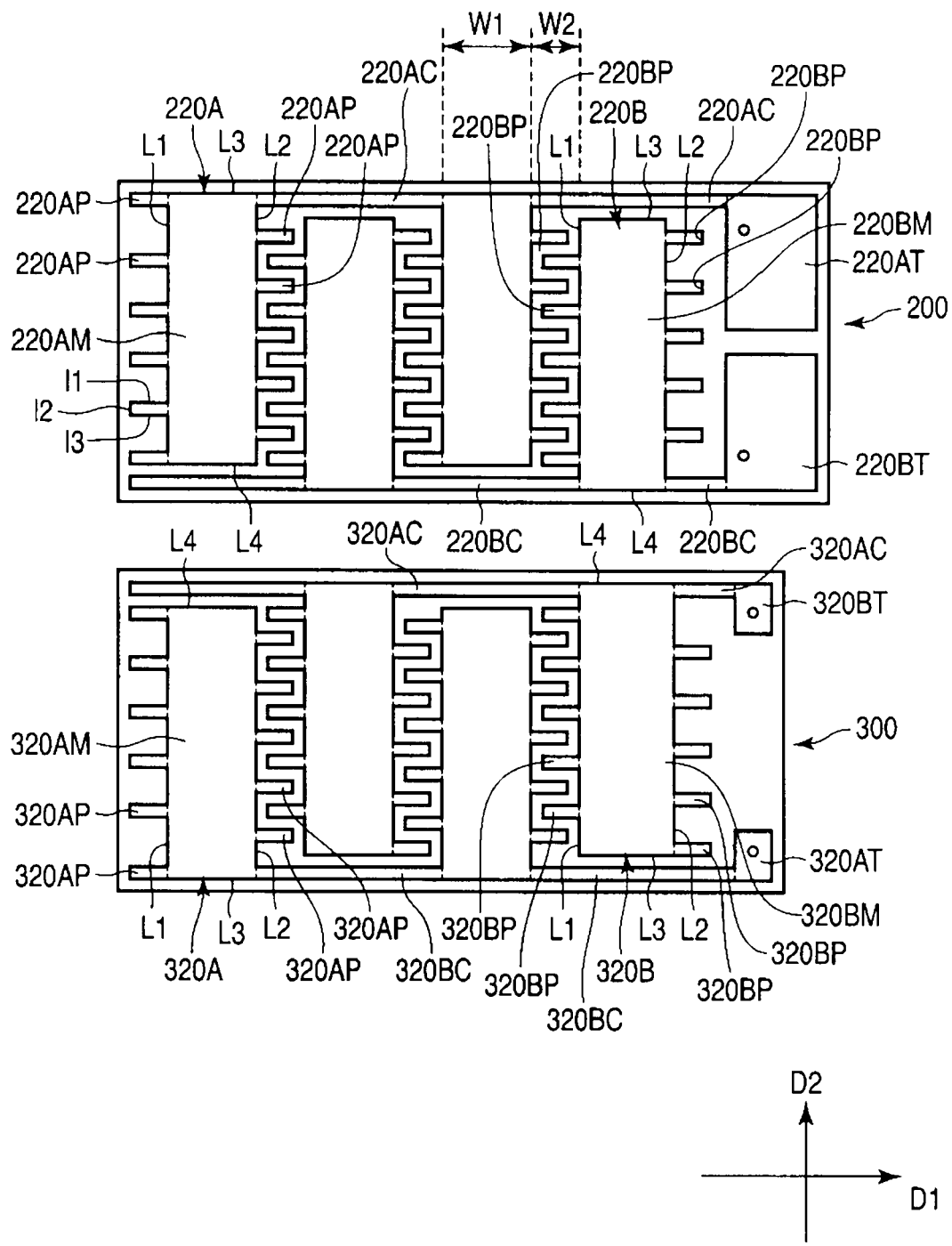
FIG. 3 is a plan view schematically showing a structure of the first electrode substrate and the second electrode substrate of the shutters for right eye and left eye shown in FIG. 1.

FIG. 3 is a plan view schematically showing the structure of the first electrode 220A, the second electrode 220B, the third electrode 320A, and the fourth electrode 320B shown in FIG. 2. Here, for convenience, a direction along which the first electrode 220A and the second electrode 220B, and the third electrode 320A and the fourth electrode 320B are alternately arranged is made a first direction D1, and a second direction D2 that perpendicularly intersects with the first direction D1.

The first electrode 220A includes a first principal portion 220AM and a plurality of first projecting portions 220AP. Here, the first principal portion 220AM is approximately rectangular. The first principal portion 220AM includes a first side L1 extending in the second direction D2 and a second side L2 opposing the first side L1, a third side L3 extending in the first direction D1 and a fourth side L4 opposing the third side L3. The plurality of first projecting portions 220AP are projected from the first and second sides L1 and L2 of the first principal portion 220AM in a sawtooth wave pattern.

Similarly, the second electrode 220B includes a second principal portion 220BM and a plurality of second projecting portions 220BP. Here, the second principal portion 220BM is approximately rectangular. The second principal portion 220BM includes a first side L1 extending in the second direction D2 and a second side L2 opposing the first side L1, a third side L3 extending in the first direction D1 and a fourth side L4 opposing to the third side L3. A plurality of second projecting portions 220BP are projected from the first and second sides L1 and L2 of the second principal portion 220B in a sawtooth wave pattern.

The first electrode 220A and the second electrode 220B are arranged so that they fit mutually. That is, the first electrode 220A and the second electrode 220B are arranged so that one second projecting portion 220BP is located between two adjoining first projecting portions 220AP. Moreover, the first electrode 220A and the second electrode 220B are arranged so that one first projecting portion 220AP is located between two adjoining second projecting portions 220BP.

The first electrode 220A and the second electrode 220B are arranged alternately. The adjoining first electrodes 220A are electrically connected by a first connection portion 220AC arranged at the perimeter. The connection end 220AT and the first electrode 220A arranged closest to the connection end 220AT are electrically connected each other by the first connection portion 220AC. The adjoining second electrodes 220B are electrically connected by a second connection area 220BC arranged at the perimeter. The connection end 220BT and the second electrode 220B arranged closest to the connection end 220BT are electrically connected each other by the second connection portion 220BC.

The third electrode 320A includes a third principal portion 320AM and a plurality of third projecting portions 320AP. Here, the third principal portion 320AM is approximately rectangular. The third principal portion 320AM includes a first side L1 extending in the second direction D2 and a second side L2 opposing the first side L1, a third side L3 extending in the first direction D1 and a fourth side L4 opposing the third side L3. A plurality of third projecting portions 320AP are projected from the first and second sides L1 and L2 of the third principal portion 320AM in a sawtooth wave pattern.

The fourth electrode 320B includes a fourth principal portion 320BM and a plurality of fourth projecting portions 320BP. Here, the fourth principal portion 320BM is approximately rectangular. The fourth principal portion 320BM includes a first side L1 extending in the second direction D2 and a second side L2 opposing the first side L1, a third side L3 extending in the first direction D1 and a fourth side L4 opposing the third side L3. A plurality of fourth projecting portions 320BP are projected from the first and second sides L1 and L2 of the fourth principal portion 320BM in a sawtooth wave pattern.

The third electrode 320A and the fourth electrode 320B are arranged so that they fit mutually. That is, the third electrode 320A and the fourth electrode 320B are arranged so that one fourth projecting portion 320BP is arranged between two adjoining third projecting portions 320AP. Moreover, the third electrode 320A and the fourth electrode 320B are arranged so that the third projecting portion 320AP is arranged between two adjoining fourth projecting portions 320BP.

The third electrode 320A and the fourth electrode 320B are arranged alternately. The adjoining third electrodes 320A are electrically connected each other by a third connection portion 320BC arranged at the perimeter. The connection end 320AT and the third electrode 320A arranged closest to the connection end 320AT are electrically connected each other by the third connection portion 320BC. The adjoining fourth electrodes 320B are electrically connected each other by a fourth connection portion 320AC arranged at the perimeter. The connection end 320BT and the fourth electrode 320B arranged closest to the connection end 320BT are electrically connected each other by the fourth connection portion 320AC.

The connection end 220AT of the first electrode 220A and the connection end 320BT of the fourth electrode 320B are electrically connected by a transfer (not shown), as mentioned above. That is, the first electrode 220A and the fourth electrode 320B are set to the same potential. The connection end 220BT of the second electrode 220B and the connection end 320AT of the third electrode 320A are also electrically connected by transfer (not shown), as mentioned above. That is, the second electrode 220B and the third electrode 320A are set to the same potential similarly.

The first projecting portion 220AP, second projecting portion 220BP, third projecting portion 320AP, and fourth projecting portion 320BP are approximately rectangular, respectively. The first projecting portion 220AP, second projecting portion 220BP, third projecting portion 320AP, and fourth projecting portion 320BP are respectively formed so as to be surrounded by a first edge l1 extending in the first direction D1, a second edge l2 extending in the second direction D2 and connected with the first edge 1, and a third edge l3 extending in the first direction D1 and connected with the second edge l2.

As an example of a size, the width W1 of the first principal portion 220AM, second principal portion 220BM, third principal portion 320AM, and fourth principal portion 320BM is respectively 100-1000 μm in the first direction D1. In the first electrode 220A and the adjoining second electrode 220B, the width between the second side L2 of the first principal portion 220AM and the first side L1 of the second principal portion 220BM is 10 μm.

By the way, it is known that the phase transition from the splay alignment state to the bend alignment state is performed quickly and in a good condition by providing a region in which various alignment directions are formed. The region becomes a starting point for the phase transition of the alignment state (transfer nucleus.)

Figure 4:
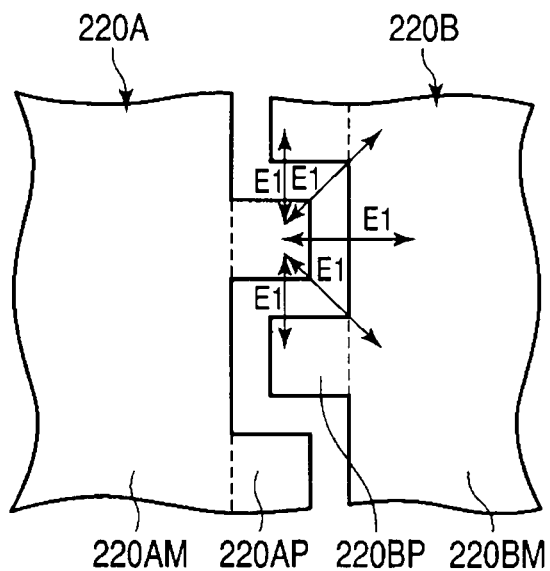
FIG. 4 is a figure showing a direction of a main electrical field formed between a first electrode of the first electrode substrate and a second electrode of the first electrode substrate shown in FIG. 3.

According to this embodiment, a potential difference is formed between the first electrode 220A and the second electrode 220B by applying different voltages respectively to the connection ends 220AT and 220BT upon supplying a power to the shutter glasses 100. Accordingly, as shown in FIG. 4, an electrical field E1 in parallel with the principal surface of the first electrode substrate 200 is formed between the sides of the first electrode 220A and the second electrode 220B. According to this embodiment, the first electrode 220A and the second electrode 220B include the first projecting portion 220AP and the second projecting portion 220BP, respectively. Therefore, in the principal surface of the first electrode substrate 200, the electrical field E1 is formed in various directions. As a consequence, since a region where the various directions for alignment of the liquid crystal molecules are formed is generated in the principal surface, the region serves as a starting point of the transfer (transfer nucleus) of the alignment. Accordingly, the transfer to the bend alignment state is performed quickly and in a good condition.

Moreover, according to this embodiment as shown in FIG. 3, a potential difference is formed between the third electrode 320A and the fourth electrode 320B by applying different voltages to the connection ends 220AT and 220BT upon supplying a power to the shutter glasses 100. Accordingly, though not shown, an electrical field E2 in parallel with the principal surface of the first electrode substrate 200 is also formed between the sides of the first electrode 320A and the fourth electrode 320B. Furthermore, a potential difference is formed between the first electrode 220A and the third electrode 320A, and between the second electrode 220B and the fourth electrode 320B. That is, an electrical field E3 approximately perpendicular to the principal surface of the first electrode substrate 200 is formed between the first electrode 220A and the third electrode 320A. Similarly, an electrical field E3 approximately perpendicular to the principal surface of the first electrode substrate 200 is also formed between the second electrode 220B and the fourth electrode 320B.

Thereby, the electrical field E1 and the electrical field E2 in parallel with the principal surface of the first electrode substrate 200, and the electrical E3 perpendicular to the first electrode substrate 200 are formed. Accordingly, the region in which the various alignment directions are uniformly formed in the principal surface of the first electrode substrate 200. The region serves as a starting point for the phase transition (transfer nucleus), and the transfer to the bend alignment state is performed more quickly and in a good condition.

As mentioned above, according to this embodiment, the shutter glasses 100 can be made into an operating state from a non-operating state in a short time, and the shutter glasses 100 can be started in a short time.

Next, the second embodiment is explained. The embodiment shown in FIG. 5 differs in the form of the first projecting portion 220AP of the first electrode 220A, the second projecting portion 220BP of the second electrode 220B, a third projecting portion 320AP of the third electrode 320A, and a fourth projecting portion 320BP of the fourth electrode 320B compared with the first embodiment shown in FIG. 4. In addition, since other structures are the same as those of the embodiment shown in FIG. 3, the same referential mark is denoted, and detailed explanation is omitted.

Figure 5:
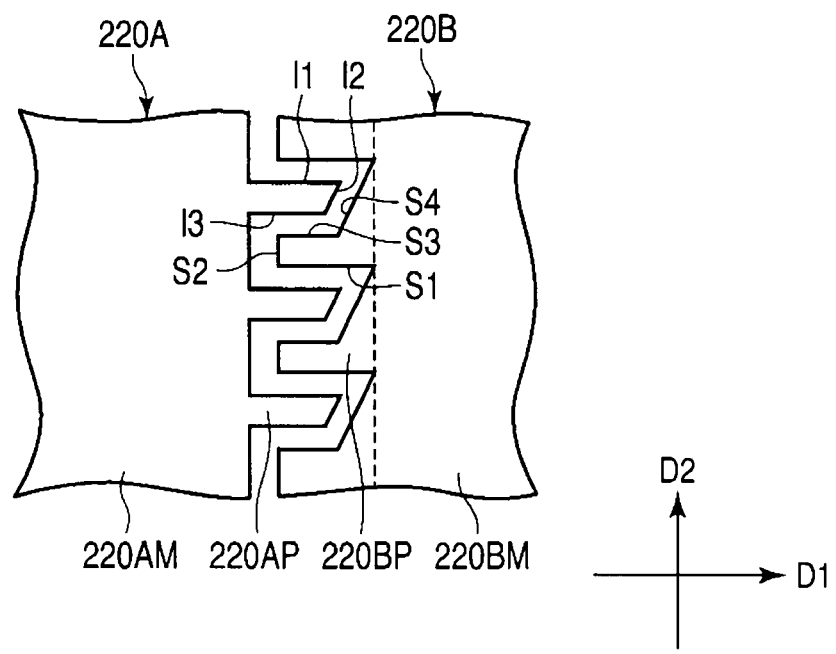
FIG. 5 is a plan view schematically showing structures of respective portions of the first electrode and the second electrode of the shutter glasses according to a second embodiment.

FIG. 5 is an enlarged plan view schematically showing the form of the first projecting portion 220AP of the first electrode 220A, and the second projecting portion 220BP of the second electrode 220B. In addition, since the form of the third projecting portion 320AP of the third electrode 320A is the same as that of the first projecting portion 220AP of the first electrode 220A, the explanation is omitted. Moreover, since the form of the fourth projecting portion 320BP of the fourth electrode 320B is the same as that of the second projecting portion 320BP, the explanation is also omitted.

As shown in FIG. 5, the projecting portions 220AP are formed in a trapezoidal shape. A plurality of projecting portions 220AP are formed so as to be surrounded by a first edge l1 extending in the first direction D1, a second edge l2 connected with the first edge l1 and extending in a direction which crosses both the first direction D1 and the second direction D2, a third edge l3 extending in the first direction D1 opposing the first edge l1 and connected with the second edge l2.

A plurality of second projecting portions 220BP are formed in a polygonal shape. The second projecting portion 220BP is formed so as to be surrounded by a first edge s1 extending in the first direction D1, a second edge s2 connected with the first edge and extending in the second direction D2, a third edge s3 connected with the second edge s2 and extending in the first direction D1 opposing the first edge s1, and a fourth edge s4 connected with the third edge s3 extending in a direction which crosses both the first direction D1 and the second direction D2.

According to this embodiment, energy to twist the molecules of the liquid crystal becomes larger, and the phase transition time is shorten.

In addition, the forms of the first electrode 220A, the second electrode 220B, the third electrode 320A, and the fourth electrode 320B may be not only those according to the above embodiments but other forms.

Next, the third embodiment is explained. The embodiment shown in FIG. 6 and FIG. 7 differ from the embodiment shown in FIG. 3 in the points that the first electrode substrate 200 includes a first light shielding layer 250 and a first insulating layer 260, and the second electrode substrate 300 includes a second light shielding layer 350 and a second insulating layer 360. In addition, since other structures are the same as those of the embodiment shown in FIG. 3, the same referential mark is denoted and detailed explanation is omitted.

Figure 6:
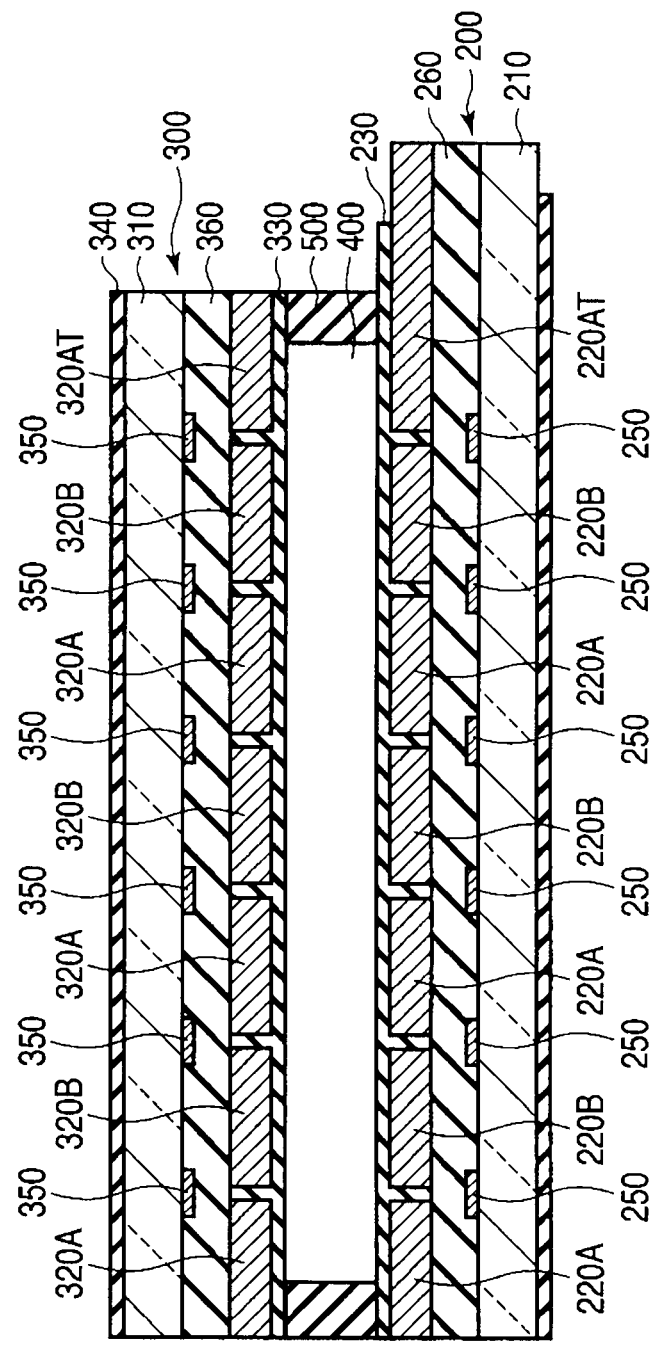
FIG. 6 is a cross-sectional view schematically showing a structure of the first electrode substrate and the second electrode substrate of the shutters for right eye and second eye according to a third embodiment.

As shown in FIG. 6, the first electrode substrate 200 includes a first light shielding layer 250 arranged between the first electrode 220A and the second electrode 220B on the first insulating substrate 210 and a first insulating layer 260 on the first light shielding layer 250. The first light shielding layer 250 is formed of metal materials, such as aluminum (Al).

The second electrode substrate 300 includes a second light shielding layer 350 arranged between the third electrode 320A and the fourth electrode 320B on the second insulating substrate 310 and a second insulating layer 360 on the second light shielding layer 350. The second light shielding layer 350 is also formed of metal materials, such as aluminum (Al) like the first light shielding layer 250.

Figure 7:
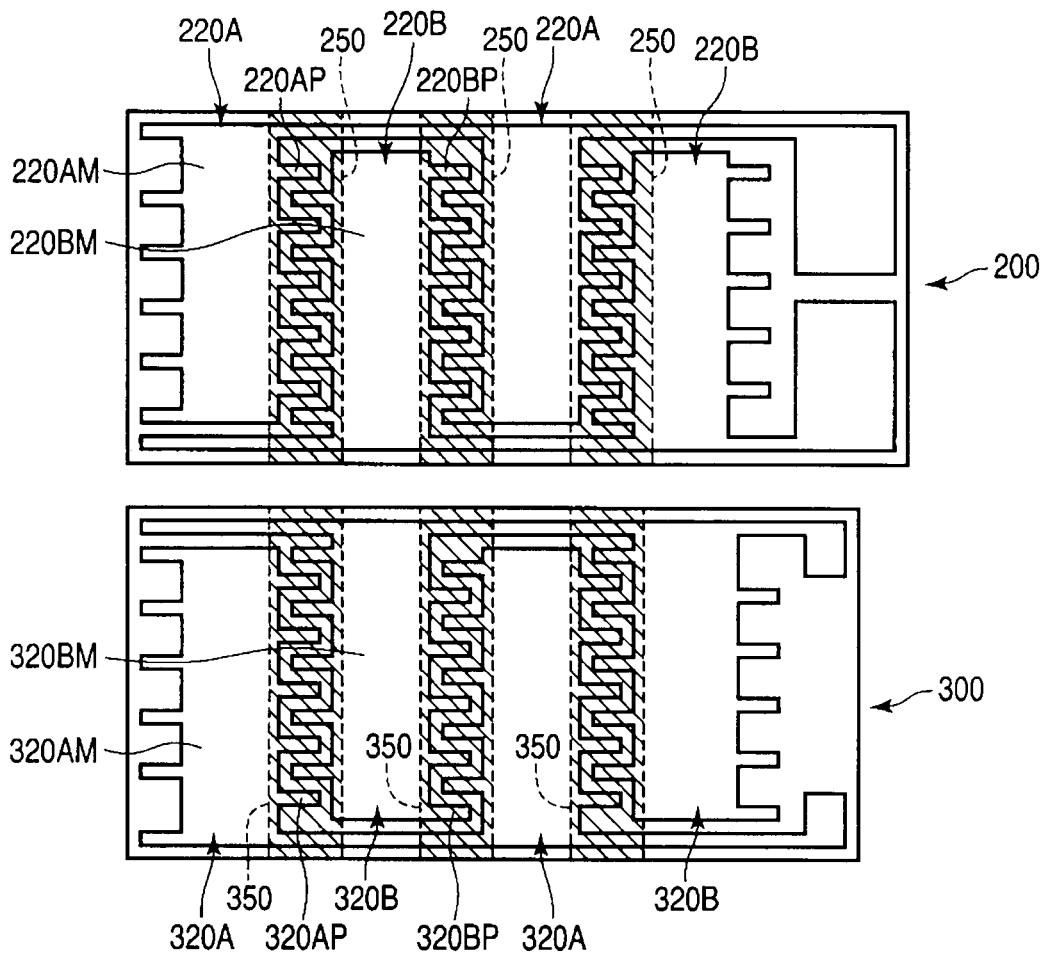
FIG. 7 is a plan view schematically showing a structure of the first electrode substrate and the second electrode substrate of the shutters for right eye and left eye of the shutter glasses shown in FIG. 6.

As shown in FIG. 7, the first light shielding layer 250 is arranged so that the first light shielding layer 250 opposes to a side portion of the first principal portion 220AM and the first projecting portion 220AP of the first electrode 220A, and a side portion of the second principal portion 220BM and the second projecting portion 220BP of the second electrode 220B in the first electrode 220A and the adjoining second electrode 220B.

The second light shielding layer 350 is arranged so that the third light shielding layer 350 opposes to a side portion of the third principal portion 320AM and the third projecting portion 320AP of the third electrode 320A, and a side portion of the fourth principal portion 320BM and the fourth projecting portion 320BP of the fourth electrode 320B in the third electrode 320A and the adjoining fourth electrode 320B.

According to this embodiment, since most of the optical leak from clearance between the first electrode 220A and the second electrode 220B can be suppressed completely, precise control of the clearance is not required. Thereby, when the image for left eye is displayed on the display portion of the television receiver, a phenomenon called 3D crosstalk in which the image for left eye is sighted by right eye though the shutter 100R for right eye is originally in the non-transmissive state can be improved more.

In addition, in the embodiment shown in FIG. 6, the first insulating layer 260 is arranged between the first insulating substrate 210 and the first electrode 220A, and between the first insulating substrate 210 and the second electrode 220B. However, when the first light shielding layer 250 is formed of insulating materials, such as black resin, it is not necessary to arrange the first insulating layer 260. Similarly, the embodiment shows a case in which a second insulating layer 360 is arranged between the second insulating substrate 310 and the third electrode 320A, and between the second insulating substrate 310 and the fourth electrode 320B. However, when the second light shielding layer 350 is formed of insulating materials, such as black resin, it is not necessary to arrange the second insulating layer 360 as well as the second insulating substrate 210.

Next, a fourth embodiment is explained. The fourth embodiment shown in FIG. 8 differs from the embodiment shown in FIG. 7 in the point that the first electrode substrate 200 includes the first light shielding layer 250 and an input electrode 250E electrically connected with the first light shielding layer 250. In addition, since other structures are the same as those of the embodiment shown in FIG. 3, the same referential mark is denoted and detailed explanation is omitted.

Figure 8:
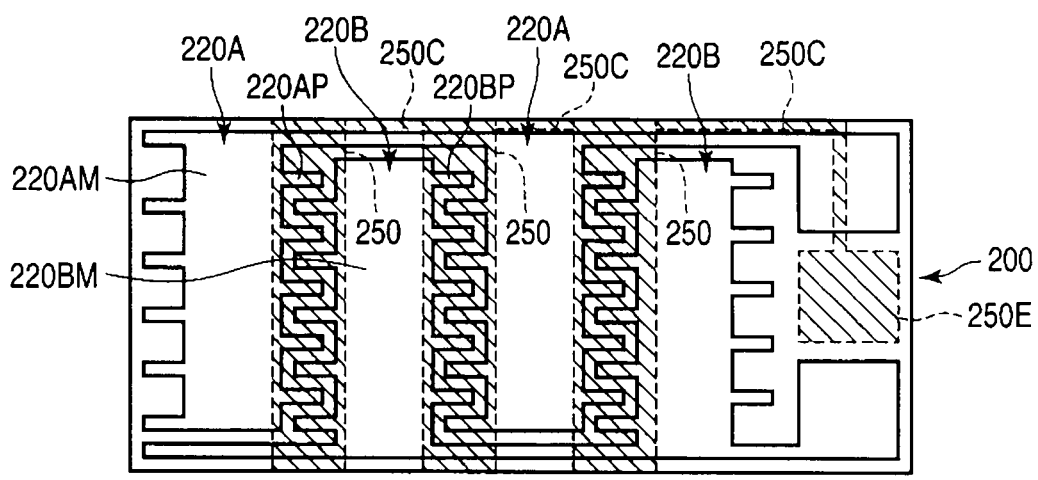
FIG. 8 is a plan view schematically showing a structure of the first electrode substrate of the shutters for right eye and left eye according to a fourth embodiment.

As shown in FIG. 8, the first electrode substrate 200 further includes the input electrode 250E. The first light shielding layers 250 are arranged side by side in the first direction D1. The adjoining first light shielding layers 250 are electrically connected by a first shielding connection portion 250C. The first light shielding layer 250 arranged closest to the input electrode 250E and the input electrode 250E are electrically connected by the first shielding connecting portion 250C.

That is, the first light shielding layer 250 and the input electrode 250E are electrically connected.

According to this embodiment, an approximately perpendicular electrical field E3 to the principal surface of the first electrode substrate 200 can be formed in the liquid crystal layer 400 between the first electrode 220A and the third electrode 320A, and in the liquid crystal layer 400 between the second electrode 220B and the fourth electrode 320B by applying a voltage to the input electrode 250E. Thereby, a region in which various alignment directions of the liquid crystal molecules are formed is provided. Accordingly, the region becomes a starting point of the phase transition (transfer nucleus), and the transfer to the bend alignment is performed more quickly and in a good condition.

According to the above embodiments, although the electrode shape of both the first electrode substrate 200 and second electrode substrate 300 are devised, if the electrode shape formed in one of the first and second electrode substrates promotes the nucleus formation, the effect for shortening the phase transition time is acquired.

Next, a relation of the television receiver of three-dimensional display system and a pair of shutter glasses with which the present invention is applied is explained further.

Figure 9:
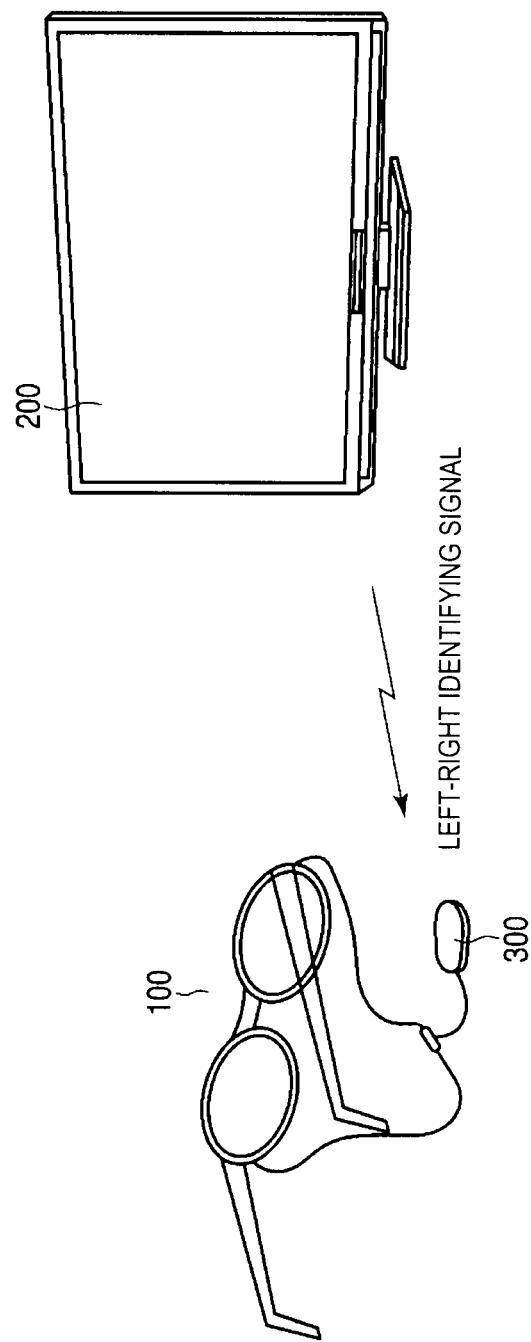
FIG. 9 is a perspective diagram schematically showing a structure of a television receiver and the liquid crystal shutter glasses for three-dimensional display.

FIG. 9 schematically shows a structure of the television receiver 200 for three-dimensional display, and the shutter glasses 100. As shown in FIG. 9, a left-and-right identifying signal is outputted from the television receiver 200 to show which of the images for right eye and left eye is shown now. The transmitting medium of the left-and-right identifying signal may be any one of a cable, a wireless or infrared rays.

The shutter glasses 100 include a receiver 300 further. The receiver 300 receives the left-and-right identifying signal, and controls the operation of the shutter 100R for right eye and the shutter 100L for left eye of the shutter glasses 100 to synchronize with the image for right eye and the image for left eye which are displayed on the television receiver 200.

Figure 10:
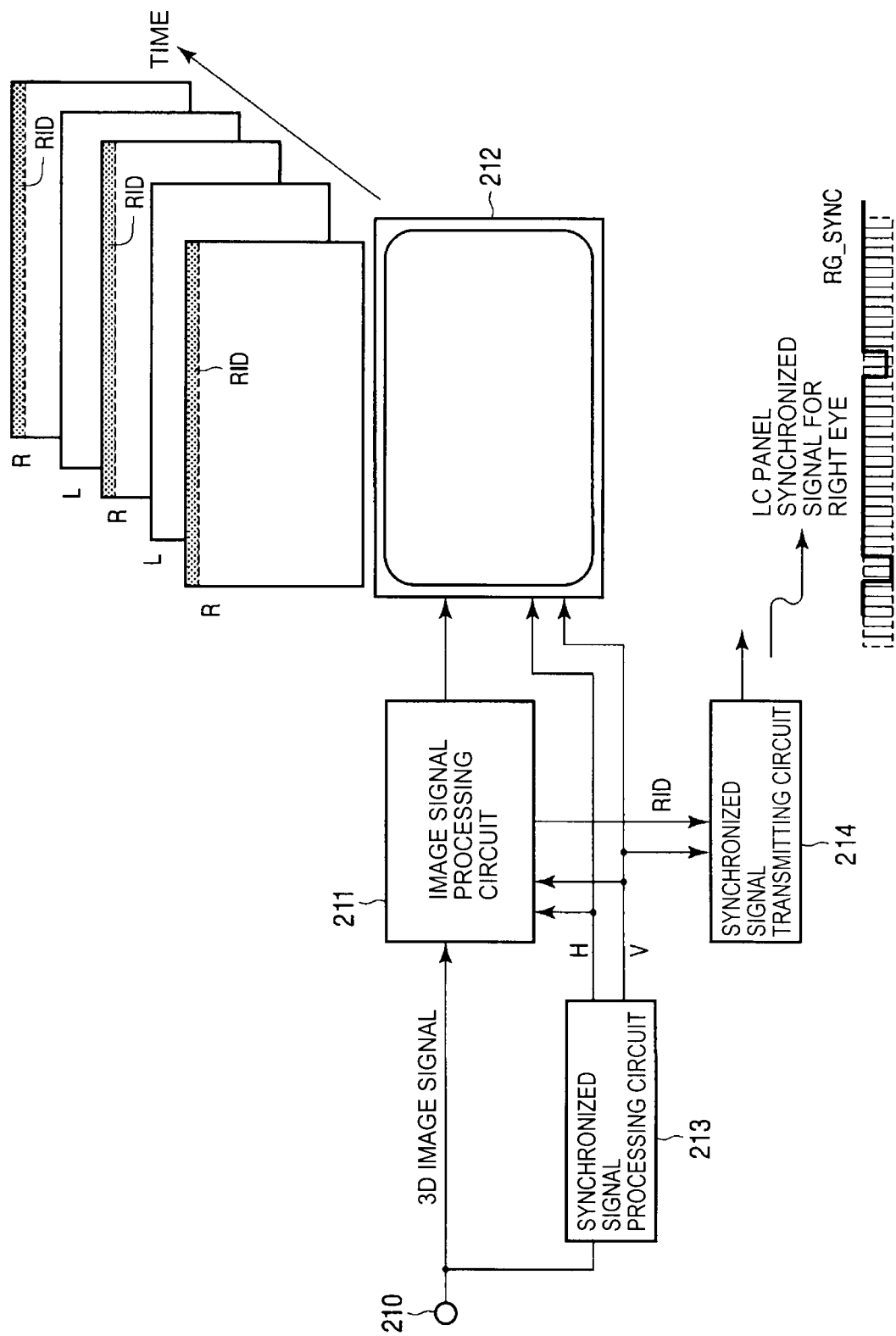
FIG. 10 is a figure schematically showing a structure of the television receiver.

FIG. 10 schematically shows the structure of the television receiver 200. In order to display the image for right eye and the image for left eye, the 3D image signal is inputted to the input terminal 210. The 3D image signal is acquired from a broadcast signal, and is also reproduced from a recording medium. Although the two-dimensional image signal is also inputted to the input terminal 210, the case where the 3D image signal is inputted is explained below.

The 3D image signal is inputted to the image signal processing circuit 211. Moreover, the 3D image signal is inputted a synchronized signal processing circuit 213. The synchronized signal processing circuit 213 separates and outputs a horizontal synchronizing signal H and a vertical synchronizing signal V from the 3D image signal.

The horizontal synchronizing signal H and the vertical synchronizing signal V are inputted to the image signal processing circuit 211, and are used as a timing pulse for signal processing. Moreover, the horizontal synchronizing signal H and the vertical synchronizing signal V are inputted to the display portion 212, and are used as a timing pulse for a horizontal scanning and a vertical scanning. The display portion 212 displays images for right eye and left eye by turns based on the image signal R for right eye and the image signal L for left eye outputted from the image signal processing circuit 211.

Here, an identifying signal RID is inserted in a portion of the image signal R for right eye in the horizontal period which does not usually appear in the display portion 212, for example, immediately after a vertical blanking period. The R identifying signal RID is extracted from the image signal processing circuit 211. The R identifying signal RID is inputted to a synchronized signal transmitting circuit 214. Moreover, the above-mentioned vertical synchronized signal V is also inputted to the synchronized signal transmitting circuit 214.

The synchronized signal transmitting circuit 214 generates a liquid crystal panel synchronizing signal RG_SYNC for right eye using the vertical synchronized signal V and the R identifying signal RID, and transmits the signal RG_SYNC to the receiver 300 of the shutter glasses 100. In this embodiment, although the liquid crystal panel synchronizing signal RG_SYNC for right eye is transmitted, the liquid crystal panel synchronized signal for left eye, or both of the synchronized signals may be transmitted.

Figure 11:
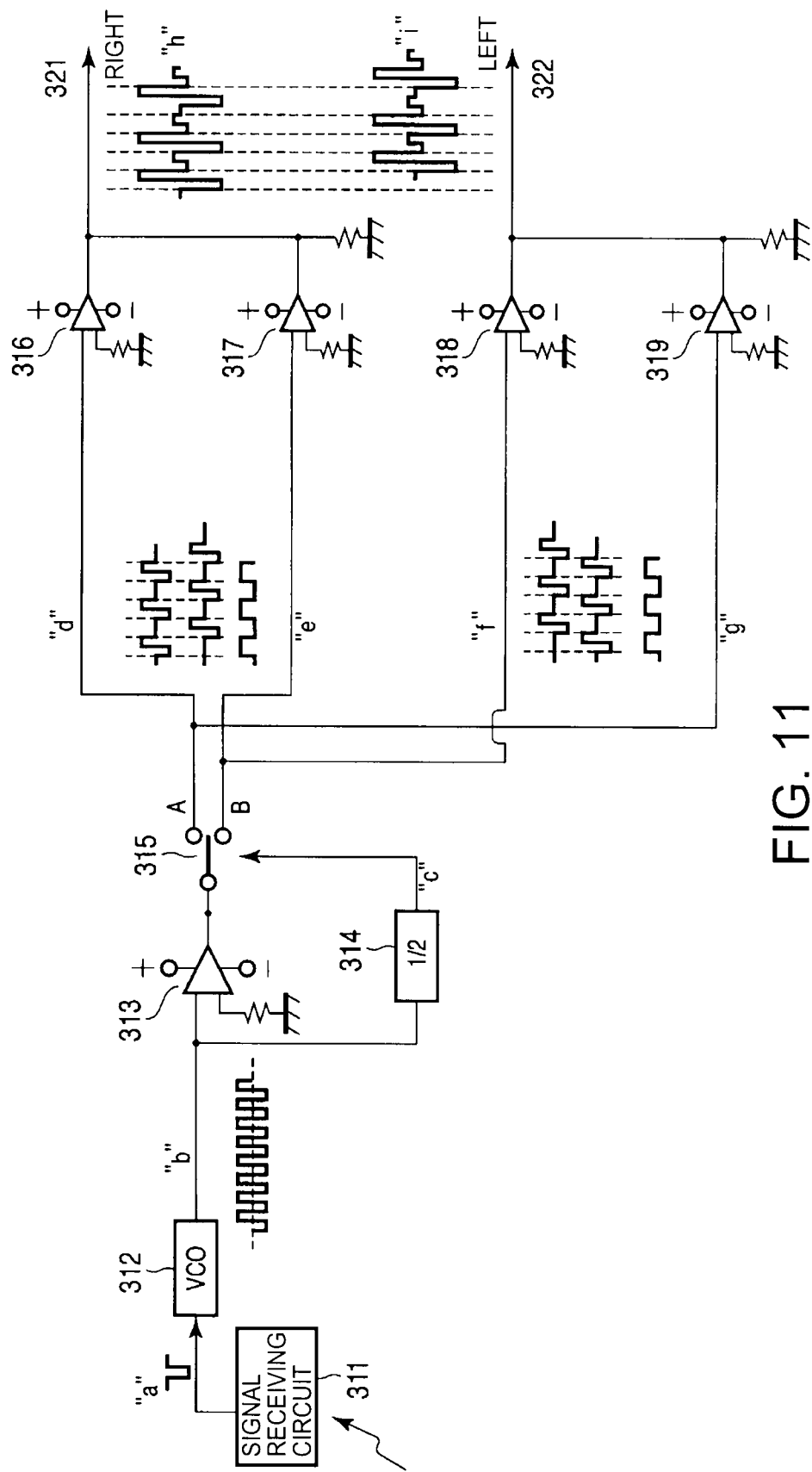
FIG. 11 schematically shows a structure of a driving circuit of a receiver of the shutter glasses.
Figure 12:
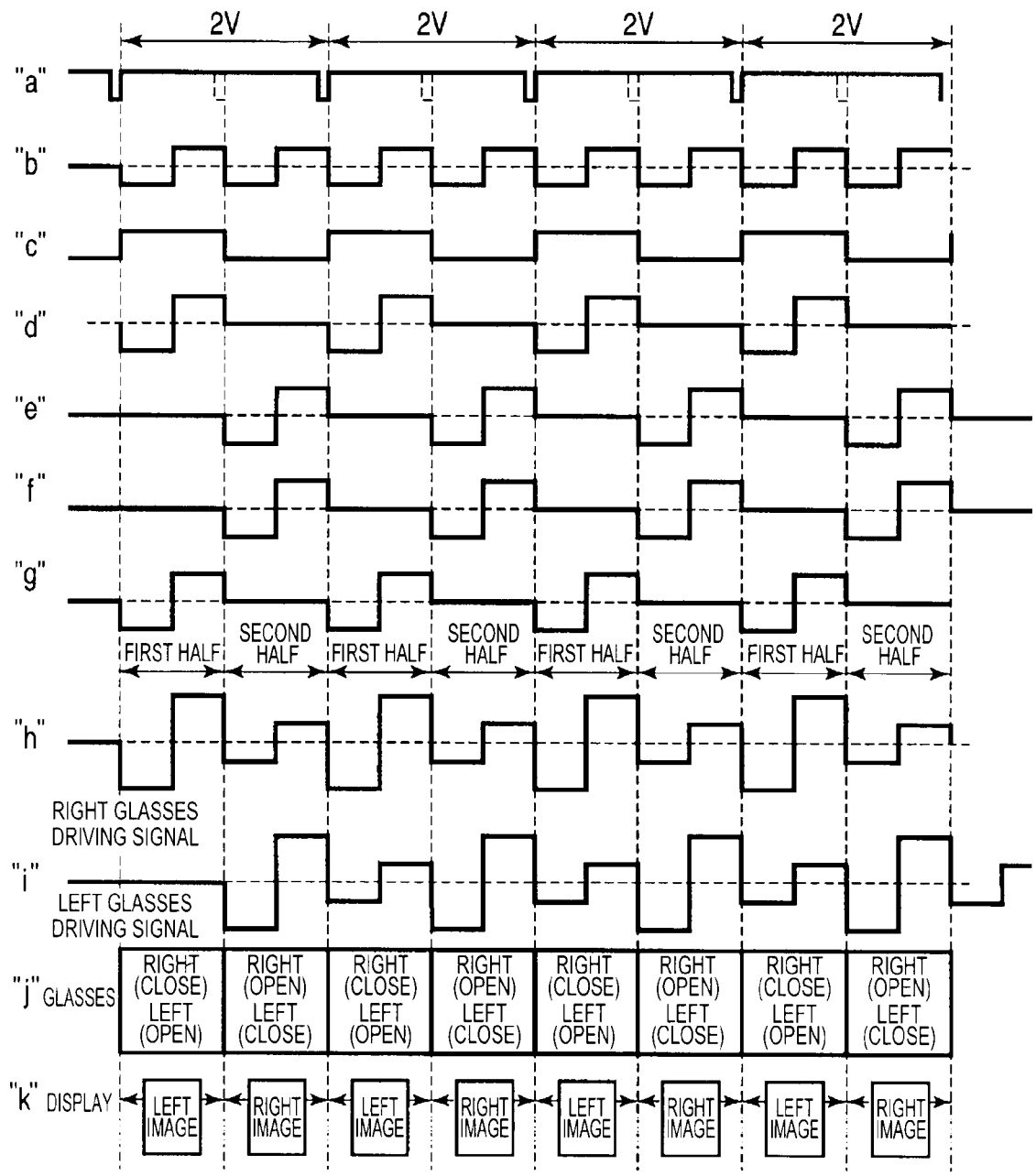
FIG. 12 shows signal waveforms of each portion of the receiver.

The receiver 300 of the shutter glasses 100 is shown in FIG. 11. FIG. 12 shows a signal waveform of each portion of the receiver 300.

The receiver 300 demodulates the liquid crystal panel synchronizing signal RG_SYNC for right eye. The liquid crystal panel synchronizing signal RG_SYNC for right eye is inputted to a voltage controlled oscillator 312 as a phase synchronizing signal "a". In the phase synchronizing signal "a", one cycle is 2V (frequency: 60 Hz) if a vertical period is V (for example, frequency: 120 Hz). The voltage controlled oscillator 312 contains a phase lock loop and a divider circuit, and generates and outputs a pulse signal "b" synchronized with the liquid crystal panel synchronizing signal RG_SYNC for right eye. The pulse signal "b" is outputted as a pulse of a cycle V with a low level period (V/2) and a high level period (V/2). The pulse signal "b" is inputted to an amplifier 313 and is transformed to a positive and negative symmetrical waveform with respect to the reference voltage and is inputted to a switch 315. Moreover, the pulse signal "b" is inputted to a ½ divider 314, and is outputted a switch control pulse signal "c".

When the switch control pulse "c" is positive, the switch 315 is connected to a terminal A, and when the switch control pulse "c" is negative, the switch 315 is connected to a terminal B. The terminal A is connected to a first amplifiers 316 and a fourth amplifiers 319, and the terminal B is connected to a second amplifier 317 and a third amplifier 318.

The first amplifier 316 amplifies the signal "d" from the terminal A, and the second amplifier 317 amplifies the signal "e" from the terminal B. The signals amplified with the first amplifier 316 and the second amplifier 317 are synthesized and are outputted to an output terminal 321 as a shutter driving signal "h" for the right eye. Here, the amplification rate of the amplifier 316 is set smaller than that of the amplifier 317. Accordingly, in the level of the signal "h", the level of the first half period is larger than that of the second half period within the period of 2V.

On the other hand, the fourth amplifier 319 amplifies the signal "g" (=d) from the terminal A, and the third amplifier 318 amplifies the signal "f" (=e) from the terminal B. The signals amplified with the amplifier 319 and the amplifier 318 are synthesized and are outputted to an output terminal 322 as a shutter driving signal "i" for left eye. Here, the amplification rate of the third amplifier 318 is set smaller than that of the fourth amplifier 319. Accordingly, in the level of the signal "i", the level of the first half period is larger than that of the second half period within the period of 2V.

Figure 14:
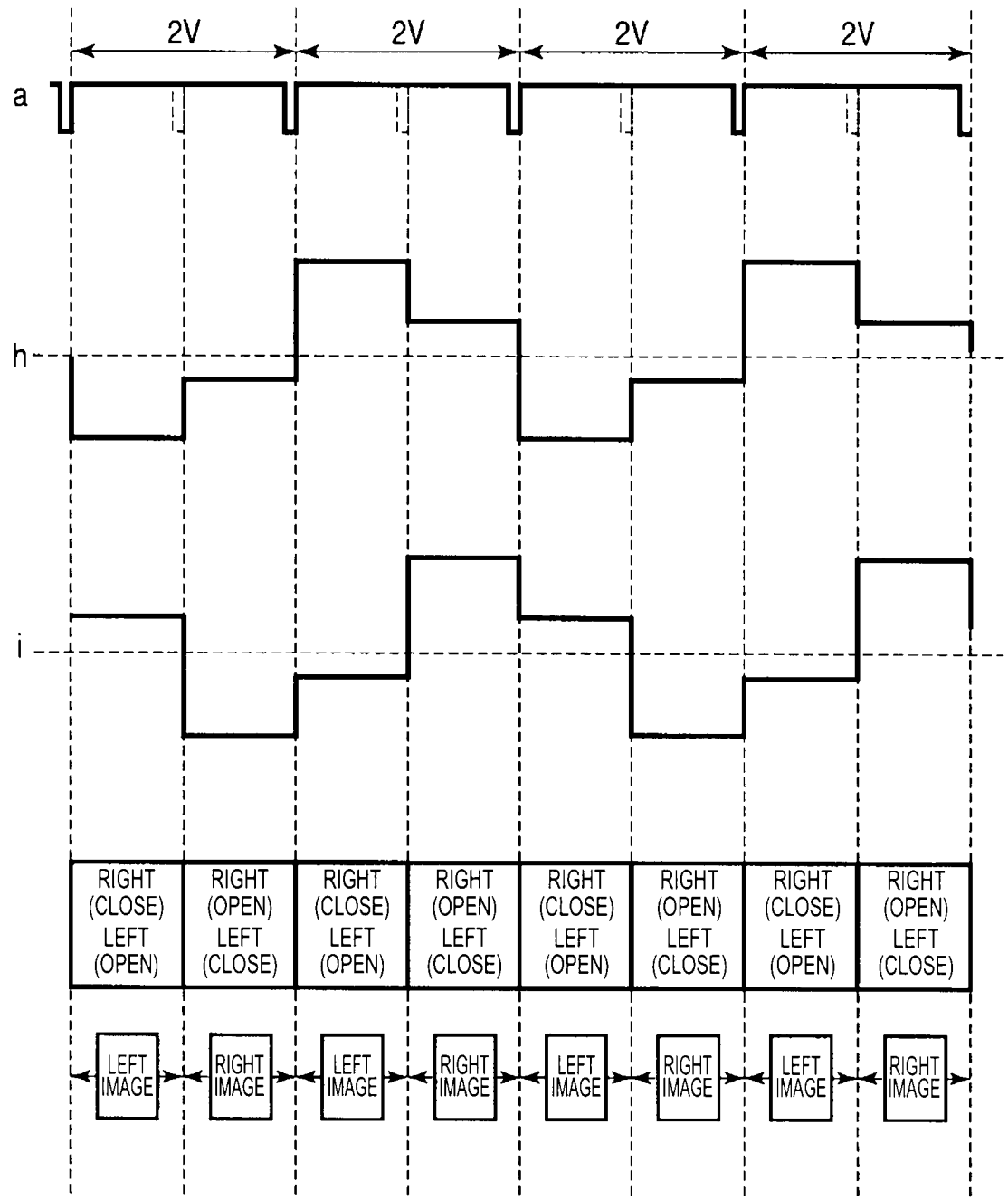
FIG. 14 shows signal waveforms of the shutter driving signals for right eye and left eye.

The shutter 100R for right eye and the shutter 100L for left eye are respectively driven by the shutter driving signal "h" for right eye and the driving signal "i" for left eye. The driving frequency for the shutter operation is set to higher frequency to suppress the flicker. In this embodiment, the shutters are controlled so as to perform a polarity inversion once during a display period for left and right images. However, the control can be performed by a sequence shown in FIG. 14. In this case, power consumption is reduced because the driving frequency is lowered.

In FIG. 12, "j" shows an opening-and-closing sequence (sequence of the transmissive state and non-transmissive state) of the shutters for left eye and right eye. Moreover, "k" shows a sequence of the images for left eye and for right eye displayed on the display portion 212 of the television receiver 200.

Figure 13:
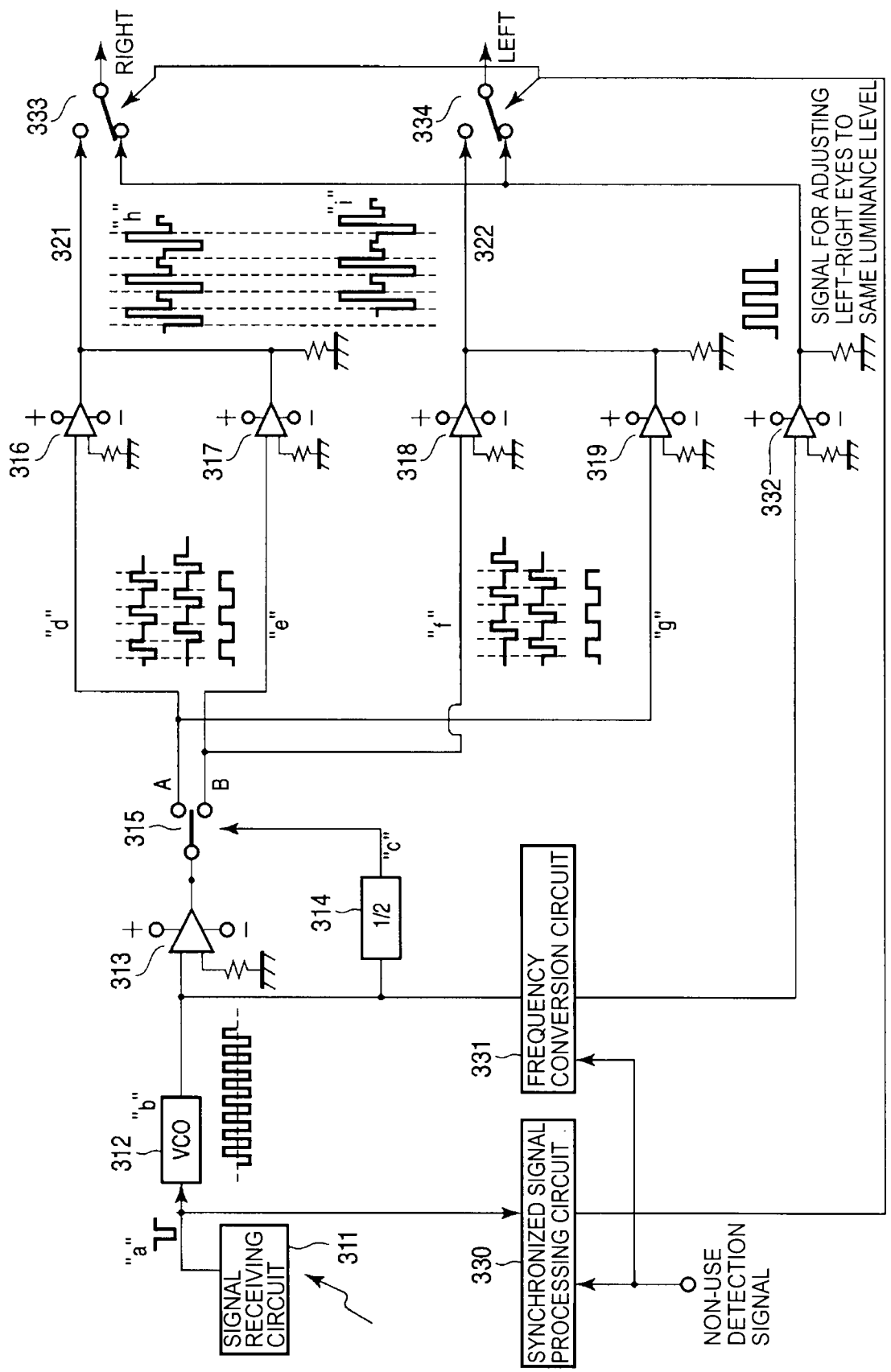
FIG. 13 schematically shows the driving circuit of the receiver of the shutter glasses corresponding to the case where 3D image signal is not transmitted.

FIG. 13 shows one example of the driving circuit of the receiver 300 of the shutter glasses 100 corresponding to the case where the 3D image signal is not transmitted to the receiving circuit 312. When the 3D image signal is not transmitted, it is not necessary to control the opening-and-closing state (switching between the transmissive state and non-transmissive state) of the shutters for right eye and for left eyes, and instead, both shutters are controlled to the open state. First, the existence of the synchronized signal is judged by a synchronized signal processing circuit 330. As mentioned above, according to the receiver 300 of this embodiment, only when 3D image is processed, the vertical synchronizing signal "a" for the shutter synchronization for right eye is transmitted. Therefore, in the case of two-dimensional image, the vertical synchronizing signal "a" is not transmitted.

If the synchronized signal processing circuit 330 detects that there is no synchronized signal, the synchronized signal processing circuit 330 controls a first switch 333 and a second switch 334 so that the shutter driving signals for right eye and for left eye become output signals from an amplifier 332. The amplifier 332 divides a signal outputted from the voltage controlled oscillator 312 by a frequency conversion circuit 331. Furthermore, the amplifier 332 amplifies the divided signal to the fixed level and outputs the amplified signal. Here, the shutter driving signals for right eye and for left eye are signals which make equally the shutter for right eye and the shutter for left eye open state (transmissive state). Thereby, the transmissivity of the shutters for right eye and left eye becomes the same level, and the user wearing the shutter glasses can watch two-dimensional image without feeling discomfort.

Moreover, a shutter glasses non-use detection signal is inputted to the synchronized signal processing circuit 330 and the frequency conversion circuit 310.

The user may not necessarily use the shutter glasses 100 always, and may not use the shutter glasses 100. While saving the power consumption of the shutter glasses 100 at the time of non-use, it is preferable to start normal operation smoothly and quickly at the time to start the use. The user may generate the shutter glasses non-use detection signal by manual operation. As other means, an automatic detector may be equipped to the shutter glasses 100. A pressure sensor or a temperature sensor, etc. may be used as the automatic detector to detect the use of the shutter glasses 100.

When the shutter glasses non-use detection signal is inputted to the synchronized signal processing circuit 330, the synchronized signal processing circuit 330 judges that the synchronized signal does not exist, and switches a first switch 333 and a second switch 334 to the amplifier 332 side. Moreover, a frequency conversion circuit 331 is equipped with a frequency adjustment circuit, and the frequency adjustment circuit changes the output of the frequency conversion circuit 331 to a low frequency by enlarging a denomination of a frequency dividing ratio. Thereby, the shutter glasses 100 are driven with low voltage and low frequency. Accordingly, the bend alignment state can be maintained without reverse transfer from the bend alignment state to the splay alignment state, and it becomes possible for the shutter glasses to make into an operating state in a short time.

Moreover, in this embodiment, even if the shutter glasses are the splay alignment state, the transfer from the splay alignment state to the bend alignment state is performed in a short time. For this reason, in order to obtain power-saving, the shutter glasses may control the transfer to the splay alignment state from the bend alignment state after a predetermined time has passed without maintaining the bend alignment. The control is performed by providing a function in which the above-mentioned low voltage and low frequency driving period can be adjusted.

While certain embodiments have been described, these embodiments have been presented by way of embodiment only, and are not intended to limit the scope of the inventions. In practice, the structural and method elements can be modified without departing from the spirit of the invention. Various embodiments can be made by properly combining the structural and method elements disclosed in the embodiments. For embodiment, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope and spirit of the inventions.

What is claimed is:

1. A pair of liquid crystal shutter glasses, comprising:
    a first liquid crystal shutter for right eye;
    a second liquid crystal shutter for left eye, the first and second liquid crystal shutters being switched to a transmissive state by turns;
    the respective first and second liquid crystal shutters including:
        a first electrode substrate and a second electrode substrate opposing the first electrode substrate, and
        an OCB (Optically Compensated Bend) mode liquid crystal layer held between the first and second electrode substrates,
    a first electrode and a second electrode arranged adjacent to the first electrode on the first electrode substrate;
    a plurality of first projecting portions provided to opposing sides of the first and second electrodes alternately for forming a transfer nucleus which is a starting point of transfer of alignment of the OCB mode liquid crystal layer;
    a third electrode and a fourth electrode arranged adjacent to the third electrode on the second electrode substrate;
    a plurality of second projecting portions provided to respective opposing sides of the third and fourth electrodes alternately,
    wherein the first and second electrodes of the first electrode substrate are arranged corresponding to the third and fourth electrodes of the second electrode substrate respectively, and
    a first voltage is applied to the first electrode and the fourth electrode, and a second voltage is applied to the second electrode and the third electrode.

2. The liquid crystal shutter glasses according to claim 1, wherein the first projecting portions include third projecting portions provided to the side of the first electrode and fourth projecting portions provided to the side of the second electrode,
    one third projecting portion is located between adjoining fourth projecting portions,
    one fourth projecting portion is located between adjoining third projecting portions, and wherein the second projecting portions include fifth projecting portions provided to the side of the third electrode and sixth projecting portions provided to the side of the fourth electrode,
one fifth projecting portion is located between adjoining sixth projecting portions,
one sixth projecting portion is located between adjoining fifth projecting portions.

3. The liquid crystal shutter glasses according to claim 1, wherein the first and second electrodes of the first electrode substrate are respectively connected to first and second terminals arranged at a peripheral portion of the first electrode substrate for supplying the first and second voltages.

4. The liquid crystal shutter glasses according to claim 3, wherein the third and fourth electrodes are respectively connected to third and fourth terminals arranged at a peripheral portion of the second electrode substrate for supplying the first and second voltages.

5. The liquid crystal shutter glasses according to claim 4, wherein the first terminal is electrically connected to the third terminal by a first transfer, and the second terminal is electrically connected to the fourth terminal by a second transfer.

6. The liquid crystal shutter glasses according to claim 5, wherein a first electrical field is formed between the first electrode and the second electrode, and between the third electrode and the fourth electrode in parallel with the surface of the first and second electrodes in various directions.

7. The liquid crystal shutter glasses according to claim 5, wherein
a second electrical field is formed between the first electrode and the third electrode, and between the second electrode and the fourth electrode in vertical with the surface of the first and second electrodes.

* * * * *